(12) United States Patent
Kim et al.

(10) Patent No.: US 7,420,739 B2
(45) Date of Patent: Sep. 2, 2008

(54) LIGHT-DIFFUSING FILM HAVING PORES

(75) Inventors: Sang Pil Kim, Gumi (KR); Jun Sang Park, Gumi (KR)

(73) Assignee: Toray Saehan Inc., Kyungsangbuk-do (KR)

( * ) Notice: Subject to any disclaimer, the term of this patent is extended or adjusted under 35 U.S.C. 154(b) by 0 days.

(21) Appl. No.: 11/276,881

(22) Filed: Mar. 17, 2006

(65) Prior Publication Data

US 2006/0209416 A1 Sep. 21, 2006

(30) Foreign Application Priority Data

Mar. 18, 2005 (KR) .................. 10-2005-0022664
Mar. 6, 2006 (KR) .................. 10-2006-0020842

(51) Int. Cl.
*G02B 5/02* (2006.01)
*G02B 13/20* (2006.01)

(52) U.S. Cl. ....................................... 359/599

(58) Field of Classification Search ............. 359/599; 428/304.1–319.9; 264/1.31–1.35, 1.6, 41–55
See application file for complete search history.

(56) References Cited

U.S. PATENT DOCUMENTS 3,255,129 A * 6/1966 Ferrari .................. 521/174
5,807,440 A * 9/1998 Kubota et al. ............ 136/256
6,610,405 B2 * 8/2003 Iriguchi et al. .......... 428/403
2001/0026309 A1 * 10/2001 Takeyama ............... 347/224
2002/0191134 A1 * 12/2002 Funahata et al. ......... 349/113
2006/0145374 A1 * 7/2006 Baba et al. .............. 264/1.34

FOREIGN PATENT DOCUMENTS

JP 51-094834 * 8/1976

* cited by examiner

*Primary Examiner*—Joshua L Pritchett
(74) *Attorney, Agent, or Firm*—Bell, Boyd & Lloyd LLP

(57) ABSTRACT

Disclosed herein is a light-diffusing film having pores for use in a backlight unit of a TFT-LCD. The light-diffusing film having pores of this invention comprises a base sheet composed of a synthetic resin; a light-diffusing layer laminated on one surface of the base sheet and having pores formed by applying a composition including a light-diffusing resin and light-diffusing particles contained in the light-diffusing resin under controlled composition supply pressure of 1~5 kgf/cm$^2$ and travel speed of the base sheet of 10~200 m/min; and an antiblocking layer laminated on the other surface of the base sheet. According to this invention, the light-diffusing film has improved total light transmittance and light diffusibility owing to the pores formed in the light-diffusing layer, and is thus usefully applicable to a backlight unit of a TFT-LCD.

8 Claims, 1 Drawing Sheet

LIGHT-DIFFUSING FILM HAVING PORES

BACKGROUND

The present invention relates to a light-diffusing film having pores for use in a backlight unit of a TFT-LCD (Thin Film Transistor-Liquid Crystal Display), and more particularly, to a light-diffusing film, in which pores are formed in a light-diffusing layer laminated on one surface of a base sheet, thereby increasing total light transmittance and light diffusibility.

In general, LCDs can be manufactured to be small and ultra slim, and can realize low power consumption and high image quality, and thus are receiving attention for use as various mobile image display devices or stationary image display devices. However, in the display using liquid crystals, the liquid crystal itself has no emission properties, unlike other flat displays, and an additional emission unit is thus required to increase the brightness of a display screen.

The emission process for the additional emission unit is largely classified into a front-light process and a backlight process. In the front-light process, a light source is attached over the front surface or front lateral surface of the display to illuminate the surface of the display. However, as the size of the display is increased, it is difficult to realize techniques for uniformly diffusing light from the light source over the surface of the display. Further, unlike the backlight process mentioned below, when the light is radiated from the front lateral side, reflective light is generated from the surface of the display, and limitations are imposed on designing the front surface of the display.

Meanwhile, the backlight process is an indirect lighting process for enhancing the brightness of a display screen in a manner such that light originating from the light source of a backlight unit mounted to the back surface of a display device is transferred to the opposite side through a light guide plate and then reflected at a reflective plate, such as a metal deposition plate or an opaque white plate, to allow the light to move forward. Thus, the backlight process is a light emission technique capable of overcoming the problems of the above-mentioned front-light process. In the backlight process, although methods of disposing large numbers of light sources to a backlight unit or of increasing the power of the light source itself have been devised in order to provide clear and bright images, they suffer because the heat generation and power consumption rates of the backlight unit are increased, undesirably reducing the lifetime of products. In particular, in the case of mobile image display devices, operation time may be shortened. Thus, in addition to the additional supply of the light source, another technical means for increasing the light intensity of LCD is required. To this end, the development of a light-diffusing film, which functions to allow light emitted from a light source lamp to pass through a diffusion plate or a light guide plate while being uniformly diffused without loss, has been proposed as a solution appropriate for increasing the light efficiency of a backlight unit. Therefore, thorough research into methods of conferring high total light transmittance and haze to the light-diffusing film is being conducted.

In this regard, Japanese Patent Laid-open Publication No. Hei. 09-270104 discloses a technique for preparing a light-diffusing resin laminate having a resin layer prepared by uniformly dispersing a light-diffusing material in a base resin containing rubber polymer. Japanese Patent Laid-open Publication No. Hei. 11-164649 discloses a light-diffusing film comprising a transparent substrate having a fine roughness on one surface thereof and a light-diffusing layer formed of an ionizing radiation curable resin on the other surface of the transparent substrate. However, such conventional techniques are disadvantageous because limitations are imposed on increasing the light transmittance and light diffusibility of the light-diffusing film, merely by using the light-diffusing material or partially changing the light-diffusing surface.

SUMMARY

Leading to the present invention, intensive and thorough research into light-diffusing films, carried out by the present inventors aiming to avoid the problems encountered in the related art, resulted in the finding that pores can be formed in a light-diffusing layer laminated on one surface of a base sheet of a light-diffusing film, whereby the light transmittance and light diffusibility of the light-diffusing film can be increased.

Accordingly, an object of the present invention is to provide a light-diffusing film having pores, which has improved total light transmittance and light diffusibility.

Another object of the present invention is to provide a light-diffusing film, comprising a base sheet, a light-diffusing layer having pores laminated on one surface of the base film, and an antiblocking layer laminated on the other surface of the base film.

In order to accomplish the above objects, the present invention provides a light-diffusing film having pores, comprising a base sheet composed of a synthetic resin; a light-diffusing layer having pores laminated on one surface of the base sheet; and an antiblocking layer laminated on the other surface of the base sheet; in which said pores are formed by applying a composition including a light-diffusing resin and light-diffusing particles contained in the light-diffusing resin under composition supply pressure of 1~5 kgf/cm$^2$ and travel speed of the base sheet of 10~200 m/min.

The light-diffusing layer may be 0.2~500 µm thick, and the antiblocking layer may be 0.1~100 µm thick.

The composition may comprise 100 parts by weight of the light-diffusing resin and 0.1~1000 parts by weight of the light-diffusing particles, including any one selected from the group consisting of acrylic resin, polyurethane, polyvinyl chloride, polystyrene, polyacrylonitrile, polyamide, and polymethylmethacrylate.

The composition may further comprise 0.01~10 parts by weight of a foaming agent. As such, the foaming agent may comprise any one inorganic foaming agent selected from the group consisting of carbonium carbonate, ammonium azoate, sodium borohydride, and azides; any one organic foaming agent selected from the group consisting of chlorofluorocarbons, azo compounds, hydrazide compounds, and nitroso compounds; or mixtures thereof.

Additional features and advantages are described herein, and will be apparent from, the following Detailed Description and the figures.

DETAILED DESCRIPTION

Figure 1:
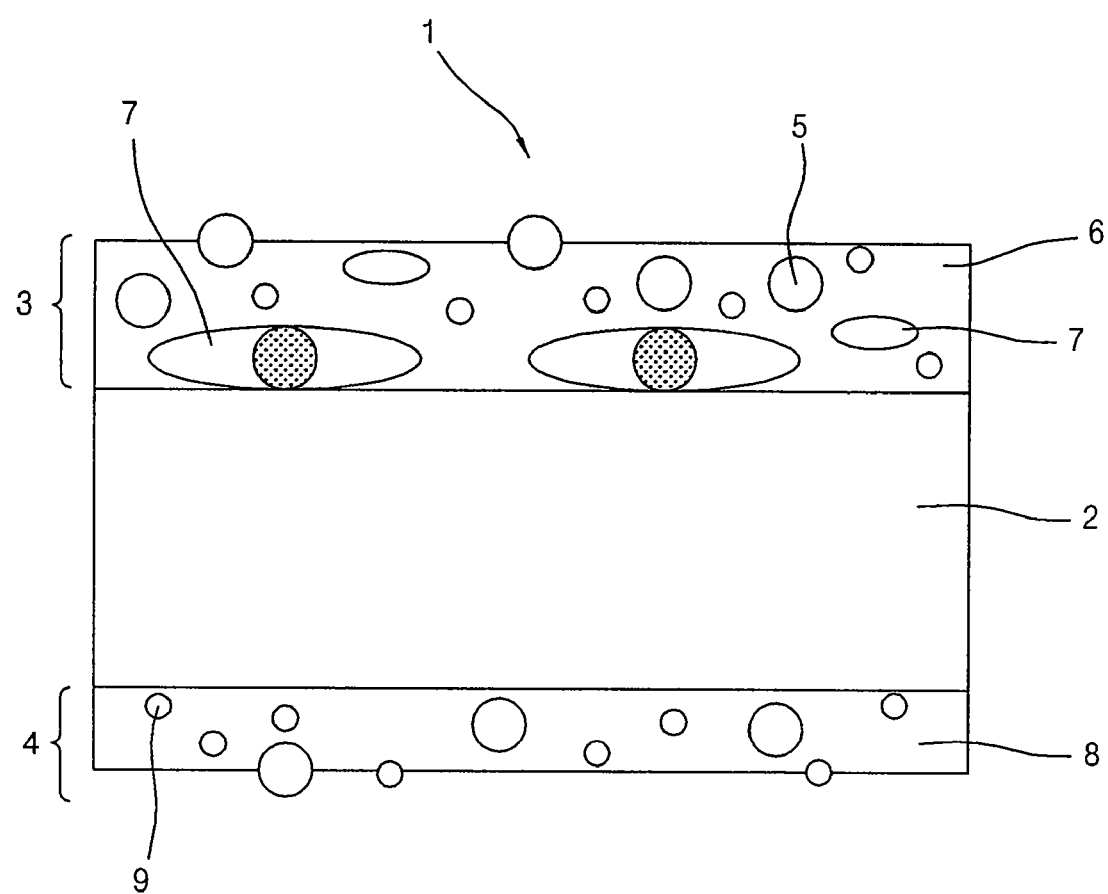
FIG. 1 is a cross-sectional view schematically showing a light-diffusing film, according to the present invention.

Hereinafter, a detailed description will be given of the present invention.

A light-diffusing film 1 having pores 7 of the present invention comprises a base sheet 2 composed of a synthetic resin; a light-diffusing layer 3 laminated on one surface of the base sheet 2; and an antiblocking layer 4 laminated on the other surface of the base sheet 2. As such, when a composition including a light-diffusing resin 6 and light-diffusing particles 5 contained in the light-diffusing resin 6 is applied on one surface of the base sheet, the supply pressure of the composition and the travel speed of the base sheet are controlled to 1~5 kgf/cm$^2$ and 10~200 m/min, respectively, thus forming pores 7.

As the base sheet 2 of the present invention, any one selected from the group consisting of polyethyleneterephthalate, polyethylenenaphthalate, acrylic resin, polycarbonate, polystyrene, polyolefin, and cellulose acetate is preferably used, but the present invention is not limited thereto. Since the base sheet 2 functions to transmit light emitted from a light source, it is preferably composed of a synthetic resin having as high a light transmittance as possible. The base sheet 2 is preferably formed to a thickness of 10~500 μm, and more preferably 75~250 μm. If the base sheet 2 is thinner than 10 μm, a curling phenomenon may be caused by the resin composition constituting the light-diffusing layer 3. On the other hand, if the base sheet 2 is thicker than 500 μm, the luminance of the LCD is decreased and a problem in that manufacturing a slim LCD is impossible may occur.

The pores 7 of the light-diffusing layer 3 are preferably formed by applying the light-diffusing layer composition including the light-diffusing resin and the light-diffusing particles contained in the light-diffusing resin at controlled supply pressure of the composition and travel speed of the base sheet. In such a case, the supply pressure is 1~5 kgf/cm$^2$, and preferably 2~4 kgf/cm$^2$, and the travel speed is 10~200 m/min, and preferably 15~100 m/min. If the supply pressure is less than 1 kgf/cm$^2$ or the travel speed is less than 10 m/min, the pores are insufficiently formed in the light-diffusing layer. On the other hand, if the supply pressure exceeds 5 kgf/cm$^2$ or the travel speed exceeds 200 m/min, the resin composition constituting the light-diffusing layer 3 is difficult to apply.

In addition, the light-diffusing layer composition for use in the formation of the pores 7 may further include an inorganic foaming agent, an organic foaming agent, or mixtures thereof. As such, the inorganic foaming agent preferably comprises at least one selected from the group consisting of carbonium carbonate, ammonium azoate, sodium borohydride, and azides, and the organic foaming agent preferably comprises at least one selected from the group consisting of chlorofluorocarbons, including trichlorofluoromethane, dichlorofluoromethane, etc.; azo compounds, including azo-bisisobutyronitrile, azodicarbonamide, etc.; hydrazide compounds, including toluene sulfonylhydrazide, 4,4'-oxybis(benzenesulfonylhydrazide), arylbis(sulfonylhydrazide), etc.; and nitroso compounds, including N,N'-dinitrosopentamethylenetetramine, etc. The foaming agent is preferably used in an amount of 0.01~10 parts by weight, and more preferably 0.1~1 parts by weight, based on 100 parts by weight of the light-diffusing layer composition. If the amount of foaming agent is less than 0.01 parts by weight, the pores are insufficiently formed in the light-diffusing layer. On the other hand, if the amount exceeds 10 parts by weight, excess pores are generated and thus formation of pores having a desired shape is interrupted.

In the present invention, the light-diffusing layer 3 has pores formed by applying the composition including the light-diffusing resin 6 and the light-diffusing particles 5 contained in the light-diffusing resin 6. The light-diffusing resin 6 preferably comprises a curable resin, and more preferably a thermosetting resin, in consideration of handling properties and availability. Examples of the thermosetting resin include, but are not limited to, any one selected from the group consisting of urea resin, melamine resin, phenol resin, epoxy resin, unsaturated polyester resin, alkyd resin, urethane resin, acrylic resin, polyurethane, fluorine resin, silicon resin, and polyamideimide (PAI). Moreover, the light-diffusing resin should be preferably colorless and transparent, since light must be transmitted therethrough. The light-diffusing resin may further include a plasticizer, a stabilizer, a deterioration preventing agent, a dispersant, an antifoaming agent, or a foaming agent, in addition to the above-mentioned resin.

The light-diffusing particles 5 comprise at least one material selected from the group consisting of acrylic resin, polyurethane, polyvinyl chloride, polystyrene, polyacrylonitrile, polyamide, and polymethylmethacrylate, and are preferably in spherical form. Moreover, it is preferred that the light-diffusing particles be colorless and transparent so as to maximize the amount of light passing through the light-diffusing film. The light-diffusing particles have a diameter of 0.1~100 μm, and preferably 1~50 μm. If the diameter is less than 0.1 μm, the light-diffusing effect becomes insufficient. On the other hand, if the diameter exceeds 100 μm, the resin composition constituting the light-diffusing layer is difficult to apply and the particles may become detached from the laminated light-diffusing layer.

As such, the ratio of light-diffusing resin 6 and light-diffusing particles 5 is adjusted, and thus the optical properties of the light-diffusing film of the present invention may be controlled. In particular, in order to manufacture a light-diffusing film having total light transmittance of 85~95%, the light-diffusing layer 3 is formed such that the light-diffusing particles 5 are used in an amount of 0.1~1000 parts by weight, and preferably 10~500 parts by weight, based on 100 parts by weight of the light-diffusing resin 6. If the amount of light-diffusing particles 5 is less than 0.1 parts by weight, the light-diffusing effect is reduced. On the other hand, if the amount exceeds 1000 parts by weight, the resin composition constituting the light-diffusing layer 3 is difficult to apply.

In addition, the thickness of the light-diffusing layer 3 is adjusted, thereby controlling the light transmittance. Particularly, with the intention of manufacturing a light-diffusing film having total light transmittance of 85~95%, the light-diffusing layer 3 is applied to a thickness of 0.2~500 μm, and preferably 2~200 μm. If the light-diffusing layer is applied to a thickness less than 0.2 μm, it has low adhesion to the film upon application, and the light-diffusing particles may become detached from the laminated light-diffusing layer. On the other hand, if the applied layer is thicker than 500 μm, total light transmittance is not higher than 84%, and thus a desired light-diffusing film cannot be manufactured.

In the present invention, the antiblocking resin 8 used in the antiblocking layer 4 preferably includes a curable resin, and more preferably a thermosetting resin, in consideration of handling properties and availability. Examples of the thermosetting resin include, but are not limited to, urea resin, melamine resin, phenol resin, epoxy resin, unsaturated polyester resin, alkyd resin, urethane resin, acrylic resin, polyurethane, fluorine resin, silicon resin, and polyamideimide. The antiblocking resin should be colorless and transparent since light must be transmitted therethrough. In addition, the antiblocking resin may further include a plasticizer, a stabilizer, a deterioration preventing agent, a dispersant, an antifoaming agent, a foaming agent or a waxing agent.

The antiblocking particles 9 used in the antiblocking layer 4 include any one selected from the group consisting of acrylic resin, polyurethane, polyvinyl chloride, polystyrene, polyacrylonitrile, polyamide, and polymethylmethacrylate, and are preferably in spherical form. As well, the antiblocking particles should be preferably colorless and transparent in order to enhance the amount of light passing through the light-diffusing film. The antiblocking particles have a diameter of 0.1~100 μm, and preferably 1~50 μm. If the diameter of antiblocking particles is less than 0.1 μm, a blocking phenomenon, which impedes the travel of the film, may occur during the process. On the other hand, if the diameter of antiblocking particles exceeds 100 μm, the resin composition constituting the antiblocking layer is difficult to apply, and furthermore, the antiblocking particles may become detached from the laminated antiblocking layer. Moreover, the antiblocking layer 4 is formed such that the antiblocking particles 9 are used in an amount of 0.01~500 parts by weight, and preferably 0.1~100 parts by weight, based on 100 parts by weight of the antiblocking resin 8. If the amount of antiblocking particles is less than 0.01 parts by weight, a blocking phenomenon, which impedes the travel of the film, may occur during the process. On the other hand, if the above amount exceeds 500 parts by weight, it is difficult to apply the resin composition constituting the antiblocking layer 4.

In order to assure high light transmittance and antiblocking function, the thickness of the antiblocking layer 4 may be controlled. Particularly, with the aim of obtaining total light transmittance of 85~95%, the antiblocking layer 4 is applied to a thickness of 0.1~100 μm, and preferably 1~50 μm. If the antiblocking layer is applied to a thickness less than 0.1 μm, it has low adhesion to the base sheet upon application and also the antiblocking particles may become detached from the laminated antiblocking layer. On the other hand, if the antiblocking layer is thicker than 100 μm, total light transmittance is decreased, and thus it is impossible to manufacture a desired light-diffusing film.

In addition, of the process of assembling BLU using a light-diffusing film, an antistatic agent may be added to or applied on the antiblocking layer of the light-diffusing film to prevent the introduction of impurities due to static electricity. As such, the antistatic agent may be exemplified by a cationic antistatic agent, an anionic antistatic agent, an amphoteric antistatic agent, a nonionic antistatic agent, a polymer-type antistatic agent, etc. Preferably, the cationic antistatic agent having excellent antistatic properties is used. The cationic antistatic agent is selected from the group consisting of quarternary ammonium salts, pyridinium salts, and mono-, sec-, and tert-amino groups. In addition, the anionic antistatic agent is selected from the group consisting of sulfonates, sulfate esters, phosphate esters, and phosphonates. In the present invention, the antistatic agent should be appropriately selected, in consideration of antistatic properties and heat resistance.

A better understanding of the present invention may be obtained in light of the following examples, which are set forth to illustrate, but are not to be construed to limit the present invention.

EXAMPLE 1

On one surface of a highly transparent polyester film (XG533-100 μm, available from Toray Saehan Inc.), a light-diffusing layer composition comprising components according to the component ratio shown in Table 1 below was applied using a die coater under process conditions shown in Table 1, and then dried at 110° C. for 60 sec, thus forming a light-diffusing film having a 30 μm thick light-diffusing layer.

TABLE 1

Light-Diffusing Layer Composition and Process Conditions

| | | Total Weight of Composition | 100 g |
|---|---|---|---|
| Light-Diffusing Layer Composition | Light-Diffusing Resin | Acrylic Resin (A-811, Aekyung Chemical Co. Ltd.) | 30 g |
| | Light-Diffusing Particles | SOKEN MX1000 (Diameter: 10 μm) | 30 g |
| | Solvent | Methylethylketone | 40 g |
| Process Conditions | Supply Pressure of Composition | 3 kgf/cm² | |
| | Travel Speed of Base Sheet | 40 m/min | |

On the other surface of the light-diffusing film, an antiblocking layer composition comprising components according to the component ratio shown in Table 2 below was applied using a Mayer bar and then dried at 110° C. for 40 sec, thus forming a light-diffusing film having a 5 μm thick antiblocking layer.

TABLE 2

Antiblocking Layer Composition

| | | Total Weight of Composition | 100 g |
|---|---|---|---|
| Antiblocking Layer Composition | Antiblocking Resin | Acrylic Resin (A-811, Aekyung Chemical Co. Ltd.) | 28 g |
| | Antiblocking Particles | SOKEN MX300 (Diameter: 3 μm) | 0.5 g |
| | Solvent | Methylethylketone | 70 g |
| | Antistatic Agent | Anionic Antistatic Agent (CHEMISTAT3111) | 1.5 g |

EXAMPLE 2

A light-diffusing layer composition comprising components according to the component ratio shown in Table 3 below was applied on one surface of a highly transparent polyester film (XG533-100 um, available from Toray Saehan Inc.) using a Mayer bar and then dried at 110° C. for 60 sec, thus forming a light-diffusing film having a 30 μm thick light-diffusing layer.

TABLE 3

Light-Diffusing Layer Composition

| | | Total Weight of Composition | 100 g |
|---|---|---|---|
| Light-Diffusing Layer Composition | Light-Diffusing Resin | Acrylic Resin (A-811, Aekyung Chemical Co. Ltd.) | 30 g |
| | Light-Diffusing Particles | SOKEN MX1000 (Diameter: 10 μm) | 30 g |
| | Solvent | Methylethylketone | 40 g |
| | Foaming Agent | Microsphere 50D, (0.1 wt part based on total weight of composition) | 0.1 g |
| Process Conditions | Supply Pressure of Composition | 3 kgf/cm² | |
| | Travel Speed of Base Sheet | 40 m/min | |

An antiblocking layer composition comprising components according to the component ratio shown in Table 4 below was applied on the other surface of the light-diffusing film using a Mayer bar and then dried at 110° C. for 40 sec, thus forming a light-diffusing film having a 5 μm thick antiblocking layer.

TABLE 4

| Antiblocking Layer Composition | | | |
|---|---|---|---|
| | Total Weight of Composition | | 100 g |
| Antiblocking Layer Composition | Antiblocking Resin | Acrylic Resin (A-811, Aekyung Chemical Co. Ltd.) | 28 g |
| | Antiblocking Particles | SOKEN MX300 (Diameter: 3 μm) | 0.5 g |
| | Solvent | Methylethylketone | 70 g |
| | Antistatic Agent | Anionic Antistatic Agent (CHEMISTAT3111) | 1.5 g |

COMPATATIVE EXAMPLE 1

A light-diffusing layer composition comprising components according to the component ratio shown in Table 5 below was applied on one surface of a highly transparent polyester film (XG533-100 μm, available from Toray Saehan Inc.) using a Mayer bar and then dried at 110° C. for 60 sec, thus forming a light-diffusing film having a 30 μm thick light-diffusing layer.

TABLE 5

| Light-Diffusing Layer Composition | | | |
|---|---|---|---|
| | Total Weight of Composition | | 100 g |
| Light-Diffusing Layer Composition | Light-Diffusing Resin | Acrylic Resin (A-811, Aekyung Chemical Co. Ltd.) | 30 g |
| | Light-Diffusing Particles | SOKEN MX1000 (Diameter: 10 μm) | 30 g |
| | Solvent | Methylethylketone | 40 g |

On the other surface of the light-diffusing film, an antiblocking layer composition comprising components according to the component ratio shown in Table 6 below was applied using a Mayer bar and then dried at 110° C. for 40 sec, thus forming a light-diffusing film having a 5 μm thick antiblocking layer.

TABLE 6

| Antiblocking Layer Composition | | | |
|---|---|---|---|
| | Total Weight of Composition | | 100 g |
| Antiblocking Layer Composition | Antiblocking Resin | Acrylic Resin (A-811, Aekyung Chemical Co. Ltd.) | 28 g |
| | Antiblocking Particles | SOKEN MX300 (Diameter: 3 μm) | 0.5 g |
| | Solvent | Methylethylketone | 70 g |
| | Antistatic Agent | Anionic Antistatic Agent (CHEMISTAT3111) | 1.5 g |

EXPERIMENTAL EXAMPLE

1. Measurement of Total Light Transmittance and Haze

The light transmittance and light diffusibility of the light-diffusing films manufactured in Examples 1~2 and Comparative Example 1 were determined according to the following procedures. While light of 550 nm was transmitted perpendicular to a 10 cm×10 cm sized light-diffusing film sample which had been stood upright, the amount of light was measured using an automatic digital hazemeter available from Nippon Denshoku Industries Co., Ltd. The haze was calculated using Equation 1 below:

$$\text{Haze } (\%) = \left( \frac{\text{totally transmitted amount of light} - \text{amount of straight light}}{\text{totally transmitted amount of light}} \right) \times 100 \quad \text{Equation 1}$$

In addition, total light transmittance was calculated using Equation 2 below:

$$\text{Total Light Transmittance } (\%) = \left( \frac{\text{totally transmitted amount of light}}{\text{amount of incident light}} \right) \times 100 \quad \text{Equation 2}$$

2. Measurement of Porosity

The porosity of each of the light-diffusing films of Examples 1~2 and Comparative Example 1 was measured using a pore measuring device via a mercury penetration process of Micro Metrics.

The results are given in Table 7 below.

TABLE 7

| Properties of Light-Diffusing Films of Examples 1~2 and Comparative Example 1 | | | |
|---|---|---|---|
| | Total Light Transmittance (%) | Haze (%) | Porosity (%) |
| Ex. 1 | 91 | 87 | 0.9 |
| Ex. 2 | 93 | 89 | 1.3 |
| C. Ex. 1 | 86 | 83 | 0 |

As is apparent from Table 7, the light-diffusing films having pores of Examples 1 and 2 had total light transmittance and light diffusibility superior to the light-diffusing film having no pores of Comparative Example 1. In addition, in the light-diffusing film of Example 2 having higher porosity than the light-diffusing film of Example 1, the light transmittance and light diffusibility were further increased. From this, light efficiency could be confirmed to increase in proportion to an increase in porosity.

As mentioned above, the present invention provides a light-diffusing film having pores, which is excellent with respect both to total light transmittance and to light diffusibility. Therefore, in the case where the light-diffusing film of the present invention is applied to a backlight unit of a TFT-LCD, it can provide high visibility throughout the entire surface of the display.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing a light-diffusing film having pores, for a backlight unit of a TFT-LCD, the method comprising:

preparing a base sheet comprising a synthetic resin;

applying a composition including a light-diffusing resin and light-diffusing particles to a first surface of the base sheet under a composition supply pressure of 1 to 5 kgf/cm$^2$ and at a travel speed of 10 to 200 m/min of the base sheet to form a light-diffusing layer having pores; and applying a composition including an antiblocking resin and antiblocking particles to a second surface of the base sheet to laminate an antiblocking layer on the second surface of the base sheet.

2. The method of manufacturing a light-diffusing film as set forth in claim 1, wherein the light-diffusing layer is 0.2 to 500 μm thick.

3. The method of manufacturing a light-diffusing film as set forth in claim 1, wherein the antiblocking layer is 0.1 to 100 μm thick.

4. The method of manufacturing a light-diffusing film as set forth in claim 1, wherein the composition comprises 100 parts by weight of the light-diffusing resin and 0.1 to 1000 parts by weight of the light-diffusing particles.

5. The method of manufacturing a light-diffusing film as set forth in claim 1, wherein the composition further comprises 0.01 to 10 parts by weight of a foaming agent.

6. The method of manufacturing a light-diffusing film as set forth in claim 5, wherein the foaming agent comprises any inorganic foaming agent selected from the group consisting of carbonium carbonate, ammonium azoate, sodium borohydride, azides; and mixtures thereof.

7. The method of manufacturing a light-diffusing film as set forth in claim 5, wherein the foaming agent comprises any one organic foaming agent selected from the group consisting of chlorofluorocarbons, azo compounds, hydrazide compounds, and nitroso compounds; and mixtures thereof.

8. The method of manufacturing a light-diffusing film as set forth in claim 1, wherein the light-diffusing particles are selected from the group consisting of acrylic resin, polyurethane, polyvinyl chloride, polystyrene, polyacrylonitrile, polyamide, and polymethylmethacrylate.

* * * * *